May 3, 1927.
J. B. VAUGHAN ET AL
1,627,298
ATTACHMENT FOR CULTIVATORS
Filed March 1, 1926   2 Sheets-Sheet 1
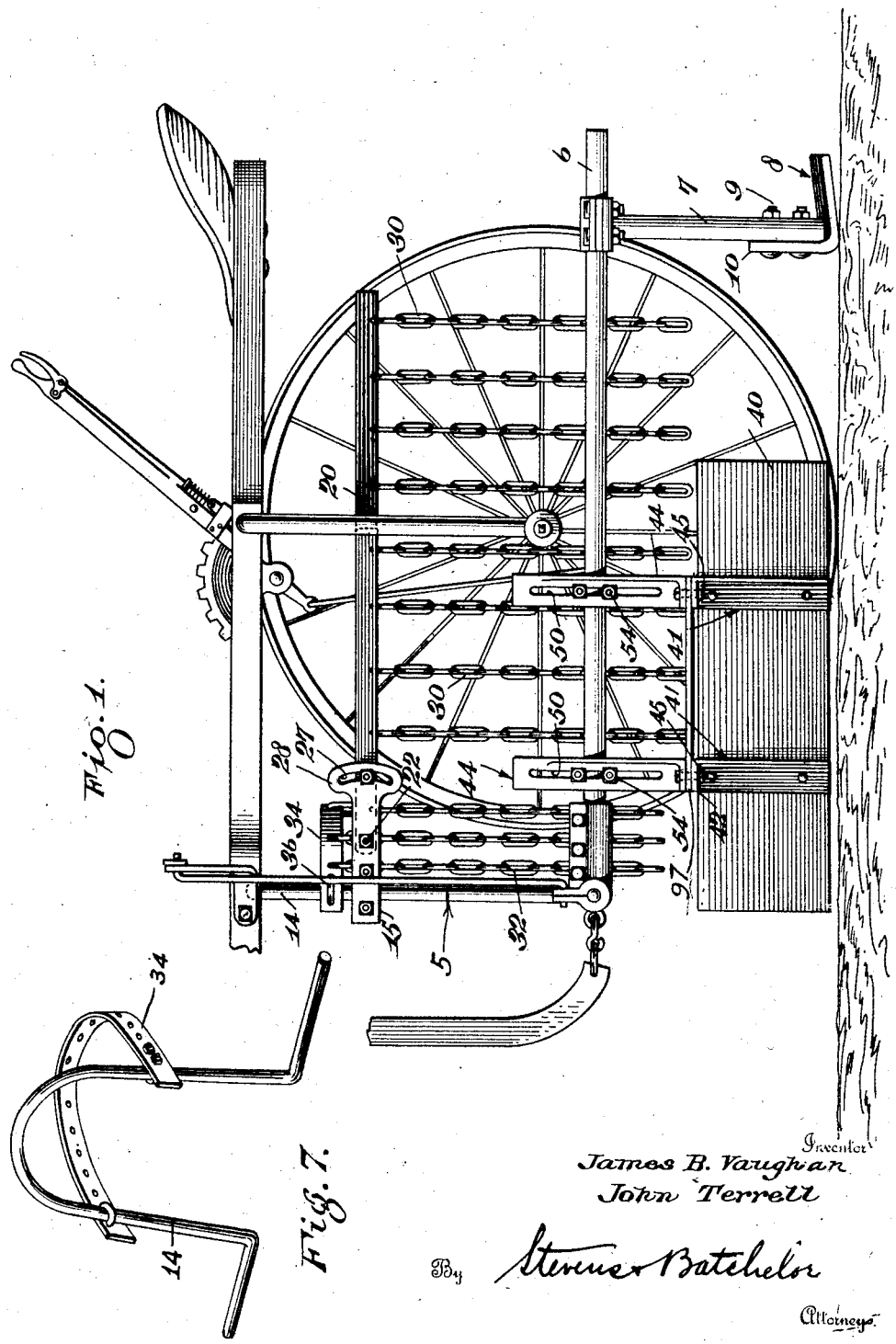
Inventor
James B. Vaughan
John Terrell
By Stevens+Batchelor
Attorneys May 3, 1927. 1,627,298
J. B. VAUGHAN ET AL
ATTACHMENT FOR CULTIVATORS
Filed March 1, 1926   2 Sheets-Sheet 2
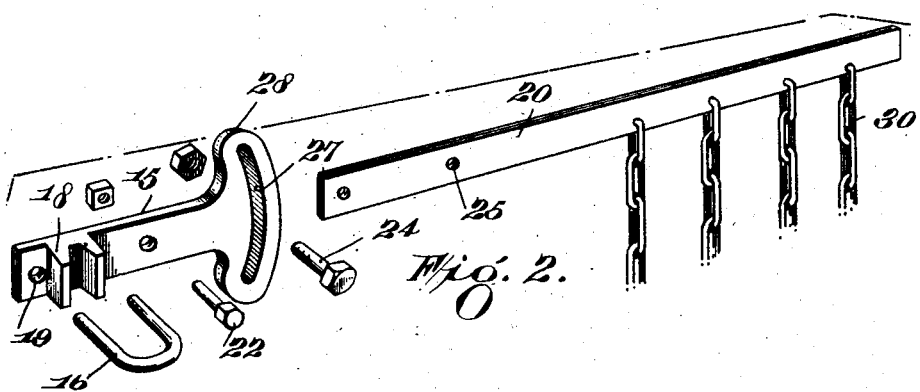
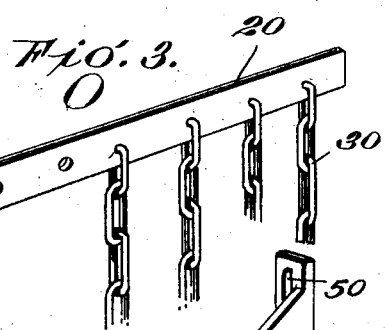
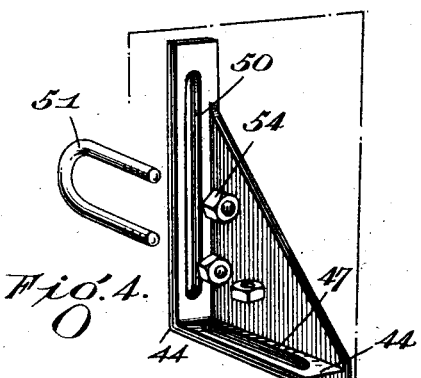
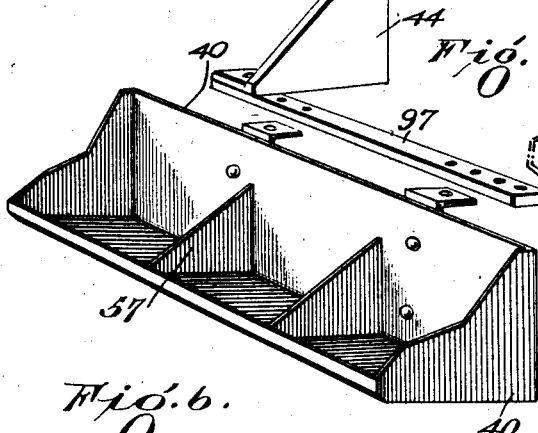
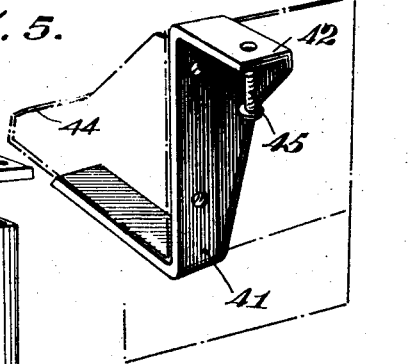
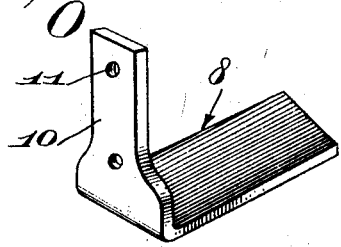
Inventor
James B. Vaughan
John Terrell
By Stevens Batchelor
Attorneys Patented May 3, 1927.

1,627,298

UNITED STATES PATENT OFFICE.

JAMES BUFORD VAUGHAN, OF LACY SPRINGS, AND JOHN TERRELL, OF TAYLORS-VILLE, ALABAMA.

ATTACHMENT FOR CULTIVATORS.

Application filed March 1, 1926. Serial No. 91,510.

This invention relates to attachments for cultivators and is an improvement on the construction illustrated in our United States Patent No. 1,468,585, dated September 18, 1923.

Briefly stated an important object of this invention is to provide a cultivator attachment having novel means whereby the liquid containing pans or troughs may be adjusted vertically and transversely for use in connection with plants of various heights and widths and for operating under a variety of conditions.

A further object of the invention is to provide a novel form of skid to take the place of the plow point when the invention is used on wet ground.

Other objects and advantages will be apparent during the course of the following description.

In the accompanying drawing forming a part of this application and in which like numerals are employed to designate like parts throughout the same.

Figure 1 is a fragmentary side elevation of a cultivator attachment constructed in accordance with this invention;

Fig. 2 is a group perspective illustrating the means for adjustably supporting the striking chains by means of which the boll weevil or the like are removed from the plants encountered;

Fig. 3 is perspective of one of the supporting arms embodied in the invention;

Fig. 4 is a group perspective of a bracket for attachment to the beam or other convenient part of the cultivator.

Fig. 5 is a perspective of a trough embodied in the invention;

Fig. 6 is a perspective of a skid or shoe embodied in the invention and which is substituted for the plow point when the ground is wet.

Fig. 7 is a perspective view of the supporting arch.

In the drawing wherein for the purpose of illustration is shown a preferred embodiment of the invention, the numeral 5 generally designates a cultivator having the usual beam 6 from which the plow stock 7 depends.

The usual plow point is supposed to be attached to the stock 7, but in case the invention forming the subject matter of this application is employed on wet or soggy ground a substantially L-shaped skid 8 is attached to the lower portion of the stock 7 by fastening bolts 9. The skid or shoe 8 is formed from a flat length of metal bent into L-shaped form and the shank 10 of the shoe is formed with openings 11 for the reception of the fastening bolts 9. It will be seen that the shoe 8 freely slides over the ground and thereby enables the cultivator to be drawn over the ground without any loss of stability.

Fig. 1 illustrates that the frame of the attachment is provided with an arch 14 to which horizontally disposed brackets 15 are connected through the medium of U bolts 16. With particular reference to Fig. 2 it will be observed that each bracket 15 is provided with a pair of transverse ribs 18 defining more or less of a pocket adapted to snugly receive a portion of the arch or supporting member 14 and when the U bolts 16 are extended through the openings 19 at opposite sides of the ribs 18 the brackets 15 are securely and positively connected to the arch. This arrangement permits of the vertical adjustment of the brackets 15.

Each bracket is provided with an arm 20 pivoted thereto by a pivot bolt 22 and adapted to be held in an adjusted position by means of a fastening bolt 24. With particular reference to Fig. 1 it will be seen that the bolt 24 extends through an opening 25 in the arm and through an arcuate slot 27 in a lateral enlargement or head 28 on the forward end of the bracket.

Thus by adjusting the arm 20, the height and position of the depending chains or striking elements 30 may be varied. As in the case of our patent, one of the rearwardly extending arms 20 is substantially longer than the other arm and is arranged in more or less parallel relation thereto.

In carrying out the invention a plurality of chains 32 are connected to a supporting member 34 secured as indicated at 36 to the arch 14. The supporting member 34 is in the nature of a curved body and extends across the frame so that the chains 32 are arranged to contact with the foliage.

The insects such as boll weevil which are knocked from the plants by the chains are received in troughs 40, the said troughs being provided with supporting members 41 of L-shaped formation. With reference to Fig. 4 it will be seen that each trough supporting member is provided at its upper end with a lateral extension 42 adjustably and flatly secured in contact with the under side of a metal strap or rod 97. The strap 97 is in turn connected by bolts 45 to the slotted lateral flanges 47 of brackets 44. It will be seen that this arrangement permits the troughs to be adjusted laterally and longitudinally.

The vertical flange of each L-shaped bracket 44 is provided with a slot 50 to receive a U bolt 51 by means of which the bracket may be secured to the beam 6 as illustrated in Fig. 1. By loosening the nut 54 on the U bolts 51 the brackets 44 may be adjusted vertically for regulating the height of the associated troughs.

Each trough is more or less L-shaped in cross section as illustrated in Fig. 5 and is provided with partitions 57 which divide each trough into a plurality of liquid containing compartments.

When preparing the attachment for operation the arms 20 are adjusted for properly positioning the striking chains 30. Of course, the chains 30 are positioned to properly engage the foliage to knock the boll weevil and other insects on the same into the troughs 40. When the boll weevil are knocked into the troughs the poisonous liquid in the troughs will immediately destroy the insects.

One of the most important features of the invention resides in the fact that the troughs 40 may be positioned vertically or transversely for use in connection with plants of different widths and heights.

Also, as previously stated, in case the ground is wet or soggy the shoe 8 may be substituted for the plow point so that the cultivator will operate over the ground without difficulty.

Having thus described the invention, what is claimed is:

1. In a cultivator having a longitudinal beam, a bracket having two angularly disposed arms, means associated with said beam and one arm of said bracket for connecting the bracket to the beam for longitudinal and vertical adjustment relative thereto, a trough member, and means associated with said trough member and the other arm of said bracket for connecting said trough and bracket in a predetermined adjusted position transversely of said cultivator.

2. A cultivator attachment comprising a beam, brackets having vertical portions formed with slots arranged adjacent said beam, bolts extending through said slots and engaging said beam and having fastening nuts adjustably connecting the brackets to the beam, said brackets being provided with horizontally disposed slotted portions, straps adjustably connected to said horizontally disposed slotted portions, and troughs having attaching members provided with laterally projecting branches adjustably connected to said straps, said troughs being adjustable longitudinally and transversely of said cultivator.

3. A cultivator attachment comprising a beam, brackets arranged adjacent said beam and having vertical portions formed with slots, U bolts engaging the beam and extending through said slots, nuts securing said U bolts to the beam and brackets, said brackets being provided with horizontally disposed portions having slots, straps having attaching bolts extending through said slots whereby to adjustably connect the straps to the horizontally disposed portions, troughs having L-shaped attaching portions formed with laterally projecting branches adjustably connected to said straps, the connection between said brackets and said beam being adjustable whereby the troughs may be adjusted vertically.

4. A cultivator attachment comprising beams, brackets arranged adjacent said beams and having horizontally disposed portions provided with slots, troughs having L-shaped supporting and attaching portions formed with laterally projecting branches, bolts extending through said laterally projecting branches, straps engaged by said fastening bolts and adjustably connected to said brackets, said troughs being adjustable longitudinally, transversely and vertically of the cultivator, a skid member connected to said beams, striking elements for engaging the foliage of the plants and removing insects from the same.

5. A cultivator attachment comprising an arch, brackets extending laterally therefrom and formed with arcuate slots, arms pivoted to said brackets, bolts connecting said brackets to said arms and being extended through said arcuate slots whereby to permit of the vertical adjustment of the arms, and striking elements carried by said arms.

6. A cultivator attachment comprising an arch, brackets having transverse ribs arranged in spaced relation for defining sockets adapted to receive portions of said arch, bolts connecting said brackets to said arms, said brackets being provided with laterally enlarged terminal portions having slots, arms pivoted to said brackets, means extending through said slots and adjustably connecting the arms to the brackets, and striking chains carried by the arms.

7. In a cultivator comprising a vertical frame member the combination of a bracket, an arm pivotally carried by said bracket intermediate the ends thereof, chains carried by said arm and depending therefrom, and means associated with said arm and the end of said bracket for clamping said arm in a predetermined position, whereby the elevation of said chains may be varied.

In testimony whereof we have signed this specification.

JAMES B. VAUGHAN.
JOHN TERRELL.